United States Patent
Quandt et al.

(10) Patent No.: US 7,234,360 B2
(45) Date of Patent: Jun. 26, 2007

(54) TMR SENSOR

(75) Inventors: Eckhard Quandt, Bonn (DE); Markus Lohndorf, Bonn (DE); Alfred Ludwig, Bonn (DE); Manfred Ruhrig, Eckental (DE); Joachim Wecker, Rottenbach (DE)

(73) Assignees: Stifting Caesar, Bonn (DE); Infineon Technologies AG, Munich (DE)

( * ) Notice: Subject to any disclaimer, the term of this patent is extended or adjusted under 35 U.S.C. 154(b) by 0 days.

(21) Appl. No.: 10/405,934

(22) Filed: Apr. 3, 2003

(65) Prior Publication Data
US 2004/0050172 A1 Mar. 18, 2004

(30) Foreign Application Priority Data
Apr. 4, 2002 (DE) ................. 102 14 946

(51) Int. Cl.
*G01B 7/16* (2006.01)
*G01L 1/00* (2006.01)
(52) U.S. Cl. .................................................. 73/779
(58) Field of Classification Search ............... 73/779, 73/763, 728, 754; 428/692, 611, 332; 360/323, 360/324.12, 324, 324.2; 257/421, 422; 365/170, 365/171
See application file for complete search history.

(56) References Cited

U.S. PATENT DOCUMENTS

| | | | |
|---|---|---|---|
| 5,168,760 A | 12/1992 | Wun-Fogle et al. | |
| 5,206,590 A | 4/1993 | Dieny et al. | |
| 5,585,986 A * | 12/1996 | Parkin | 360/324 |
| 5,633,092 A * | 5/1997 | Gibbs | 428/611 |
| 5,841,692 A * | 11/1998 | Gallagher et al. | 365/173 |
| 5,856,617 A | 1/1999 | Gurney et al. | |
| 5,936,293 A * | 8/1999 | Parkin | 257/422 |
| 6,023,395 A * | 2/2000 | Dill et al. | 360/324.2 |
| 6,077,618 A * | 6/2000 | Sakakima et al. | 428/811.5 |
| 6,168,860 B1 * | 1/2001 | Daughton | 428/332 |
| 6,278,593 B1 * | 8/2001 | Nakatani et al. | 360/324.2 |
| 6,483,741 B1 * | 11/2002 | Iwasaki et al. | 365/170 |
| 6,576,969 B2 * | 6/2003 | Tran et al. | 257/421 |

(Continued)

FOREIGN PATENT DOCUMENTS

| | | |
|---|---|---|
| DE | 198 30 343 | 4/2000 |
| DE | 198 36 567 | 12/2000 |
| DE | 199 49 714 | 4/2001 |
| DE | 100 09 944 | 9/2001 |
| DE | 100 28 640 | 12/2001 |

OTHER PUBLICATIONS

"Neel 'orange-peel' coupling in magnetic tunneling junction devices", by B.D. Schrag et al, *Applied Physics Letters*, vol. 77, No. 15, Oct. 9, 2000.

(Continued)

*Primary Examiner*—Michael Cygan
*Assistant Examiner*—O. Davis
(74) *Attorney, Agent, or Firm*—Lowe Hauptman & Berner

(57) ABSTRACT

A sensor for measuring mechanical changes in length, in particular a compressive and/or tensile stress sensor, includes a sandwich system with two flat and superposed electrodes separated from each other by a tunnel element (tunnel barrier), in particular an oxide barrier, a current being set up between the electrodes and through the tunnel barrier, one electrode consisting of a magnetostrictive layer 3 which responds to elongation, and wherein the contributions of the anisotropies caused by mechanical tension are larger than those from the intrinsic anisotropies, relative changes in system resistance $\Delta R/R$ larger than 10% at room temperature being attained during elongation.

26 Claims, 4 Drawing Sheets

U.S. PATENT DOCUMENTS

| | | | |
|---|---|---|---|
| 6,625,058 B2* | 9/2003 | Iwasaki | 365/171 |
| 6,657,829 B2* | 12/2003 | Nakazawa et al. | 360/324.2 |
| 6,661,626 B2* | 12/2003 | Gill | 360/324.2 |
| 6,690,163 B1* | 2/2004 | Hoshiya et al. | 324/252 |
| 6,694,822 B1* | 2/2004 | Ganapathi et al. | 73/763 |
| 6,822,838 B2* | 11/2004 | Lin et al. | 360/324.2 |
| 6,901,652 B2* | 6/2005 | Hasegawa et al. | 29/603.15 |
| 6,988,414 B2* | 1/2006 | Ruhrig et al. | 73/779 |

OTHER PUBLICATIONS

"Layered Magnetic Structures: Evidence for Antiferromagnetic Coupling of Fe Layers across Cr Interlayers", by P. Grunberg et al, *Physical Review Letters*, vol. 57, No. 19, Nov. 10, 1986.

* cited by examiner

TMR SENSOR

FIELD OF THE INVENTION

The present invention relates to a sensor for measuring mechanical changes in length, in particular a mechanical pressure and/or tension sensor, comprising a sandwich system with two flat, superposed electrodes separated by a tunnel component (tunnel barrier), in particular by an oxide barrier exhibiting tunnel magneto-resistance (TMR).

BACKGROUND OF THE INVENTION

Magneto-resistance sensors that are based on the GMR (Giant Magneto-Resistance) effect (P. Grünberg, R. Schreiber, Y. Pang, M. B. Brodsky, H. Sowers, *Physical Review Letters* 57, 2442 [1986]: "Layered Magnetic Structures: Evidence of antiferromagnetc coupling of Fe-Layers across Cr-interlayers") illustratively are used as angular sensors or read heads in hard disk drives. In general however only the very high sensitivity to magnetic fields is being exploited for such purposes. Attempts already have been made to use so-called TMR (Tunnel Magneto-Resistance) elements as non-volatile magnetic storage media (MRAM, magnetic random access memory). The principles involves are summarily discussed below. A conventional, voltage-insensitive GMR sensor is configured as follows:

In the simplest case, two magnetic layers illustratively cobalt layers are separated by a non-magnetic layer, for instance made of copper. At the proper spacer layer thickness, the magnetic layers will couple anti-ferromagnetically as long as the external field is zero. If an external magnetic field is applied, the direction of magnetization of the magnetically softer layer will be rotated. At saturation, the two magnetic layers will couple parallel to each other. An electrical resistance differential arises between these two states.

This relative change in resistance, which is caused by an angular change of the directions of magnetization, is described by the relation $$\Delta R/R = (\Delta R/2R)_{max}(1-\cos \alpha)$$

where $(\Delta R/R)_{max}$ denotes the maximum relative change in resistance of a given system of layers and where $\alpha$ denotes the angle between the two directions of magnetization of the two magnetic layers.

Moreover there are layer configurations for which the magnetic layers remain uncoupled on account of a more substantial thickness of the spacer layer. The lower layer consists of a hard-magnetic material exhibiting uni-axial anisotropy pointing anti-parallel to the orientation of the soft-magnetic layer. This condition is typically attained using as the lower layer a magnetic layer coupled to a synthetic anti ferro-magnet and a soft-magnetic layer as the upper layer, said upper layer being rotatable by an external magnetic field. In the case of GMR, so-called "spring valves" are used. Relative resistivity changes $\Delta R/R$ of 3% to a maximum of 5% have been measured at room temperature for such configurations. Substantially higher values may be attained with multi-layer systems.

Basically the TMR structures exhibit a similar behavior as the GMR components. They are characterized in that the two magnetic electrodes are separated by a thin oxide barrier instead of a metallic, non-magnetic spacer layer. The tunnel current through the barrier depends on the directions of the electrode magnetizations as long as spin-flip dispersion is averted.

Isotropic ferro-magnets exhibit a magneto-elastic energy density described by $$E_{me} = -(3\sigma\lambda_s \cos^2\theta)/2$$

where $\lambda_s$ is the magnetostriction at saturation and where $\sigma$ is the external mechanical stress. This energy density describes the interaction between the magnetic torques and the internal and external mechanical stresses. The angle between the stress axis and the direction of magnetization is denoted by $\theta$.

As regards positively magnetostrictive material under mechanical tension, it follows that the torques align in the direction of the axis of tension. Compressive stresses cause orientation perpendicularly to the stress axis. This behavior is reversed for negatively magnetostrictive materials.

The ratio of the magneto-elastic energy $E_{me}$ to the total energy E is denoted by the magneto-mechanical coupling coefficient $k_{33}$. This coefficient is defined as follows:

$$k_{33} = E_{me}/E_{tot}$$

The elongation sensitivity $$GF = (\Delta R/R)/\Delta\epsilon \quad \text{[gauge factor]}$$

i.e. the gains for the metal-based strain gauges are between 2 and 4. The so-called piezo-resistive sensors based on doped silicon are between 80 and 180.

Already a substantial number of magneto-resistance sensors using magnetostrictive materials is known. Illustratively U.S. Pat. No. 5,168,760 discloses a magnetic multi-layer exhibiting a periodic sequence of two different layers, one ferromagnetic, the other non-ferromagnetic. The ferromagnetic layers always couple to each other in anti-parallel manner. By applying a small magnetic field, the anti-ferromagnetic coupling of the layer torques is slightly changed toward ferromagnetic coupling. If magnetostrictive layers are used as the ferromagnetic layers, then an external mechanical stress may entail further rotation of the magnetic torques toward ferromagnetic coupling, resulting in a large change in resistance.

Moreover a two-element sensor based on the GMR effect is known whereby the effect of mechanical stress and magnetic field on the sensor signal may be separated. One hard-magnetic layer with a given direction of magnetization is used in both sensor elements and furthermore two soft-magnetic layers each time are separated by a non-magnetic one. These soft-magnetic layers are exposed to an oppositely directed magnetic biasing field of the same intensity. As a result the above cited separation of sensor signals may be attained by analyzing the sum and difference signal.

The following design also is known: a sensor consists of a pinned magnetic layer, of a non-magnetic layer and a free magnetostrictive layer in a configuration exhibiting the high magnetoresistive effect. This design exploits the fact that the permeability of the free magnetic layers changes on account of magnetostriction. When an appropriate magnetic biasing field is applied, a mechanical stress will entail a strong change in electrical resistance.

U.S. Pat. No. 5,856,617 describes a GMR layer configuration to measure the deflection of an AFM (atomic force microscope) cantilever beam. The magnetically free layer of this configuration exhibits non-vanishing magnetostriction. This document discloses a GMR layer configuration having a magnetostrictive structure composed of a triple layer of Ni—Fe, Ni and Co, and further applications as an AFM sensor.

Another publication has disclosed the effect of amorphous CoFeNiSiB layers acting as the magnetically soft layer in TMR elements. This alloy substance is a non-magnetostrictive alloy. This research led to observed TMR effects of 12%.

SUMMARY OF THE INVENTION

Accordingly it is the objective of the present invention to create a sensor that shall be used in particular to accurately and precisely detect mechanical values. Such a sensor also shall allow maximal miniaturization compared to known strain gauges or magneto-elastic sensors.

The basic concept for this novel sensor is a special combination of thin films exhibiting a TMR (tunnel magneto-resistance) effect with layers that exhibit magneto-elasticity. The magneto-elastic material used in the proposed sensor advantageously shall exhibit as high as possible a magneto-mechanical coupling coefficient $k_{33}$ which is equivalent to high sensitivity. Magneto-elastic sensors that are based on thin tapes of films attain sensitivities up to $2 \times 10^5$.

The invention offers the considerable advantage of high spatial resolution of the new sensor. Compared with competing technologies such as stratified composites with piezo-electric effects or the above cited principles, TMR structures are characterized by their small lateral dimensions. Accordingly they enable applications requiring sensor arrays which elude the competing technologies, for instance in bio sensor applications or regarding data storage using AFM stylus arrays.

As regards the sensor of the present invention, the individual magnetic layers of conventional TMR layer systems are replaced by special layers exhibiting magnetostrictive properties. Highly magnetostrictive materials must be used which furthermore exhibit high spin polarization and accordingly, besides high sensitivity to elongation, also enable sufficiently high $\Delta R/R$ values of about 20 to 50%. Alloys containing CoFe were found to be extremely well suited. Consequently mechanical magnitudes may be measured on account of a relative range of resistance in the TMR system taking place on account of a magneto-elastically induced change of the direction of the magnetic torques in those layers. Therefore the sensitivity to elongation of our design should exceed that of conventional metals or strain gauges and the semiconductor-based sensors. It was found that substantially higher sensitivities or magnifying factors could be attained for typical changes in resistance of TMR elements and typical ranges of elongation when reversing the magnetization of magnetostrictive layers. The experimental work corroborated the theoretical estimates.

Moreover the TMR sensors allow significant improvements regarding size and hence better spatial resolution in mechanical strain gauges because these TMR elements may be manufactured is sizes of a few 100 nanometers (nm). Interferences such as external magnetic fields or temperature changes may be compensated by a special, multilayer design, for instance by mounting the sensors in a bridge configuration.

The applicability of such sensors in particular relates to accurately and precisely determine mechanical magnitudes. On account of the compact sensor structure attained with thin-film technology, measurements also may be carried out on components or structures of which the sizes are in the micron (µ) range. Using the TMR sensors of the invention allows significant improvement as regards sensitivity, compactness and hence spatial resolution of the mechanical strain gauge. The new sensor offers substantial improvement over the extant technologies in at least one performance aspect (sensitivity or compactness).

Pertinent tests have shown that after the barrier has been deposited, the vacuum may be interrupted and the mating electrode may be deposited in another chamber without thereby entailing considerable signal losses. Photolithographic structuring stages in making the lower electric contacts are required for the TMR sensor to set the tunnel current. Relative changes in resistance $\Delta R/R$ larger than 40% have been observed in TMR structures. Furthermore TMR elements may be manufactured with dimensions in the sub micron range.

BRIEF DESCRIPTION OF THE DRAWINGS

Illustrative embodiments of the present invention are elucidated below in relation to FIGS. 1 through 3.

DETAILED DESCRIPTION OF THE PREFERRED EMBODIMENTS

Figure 1:
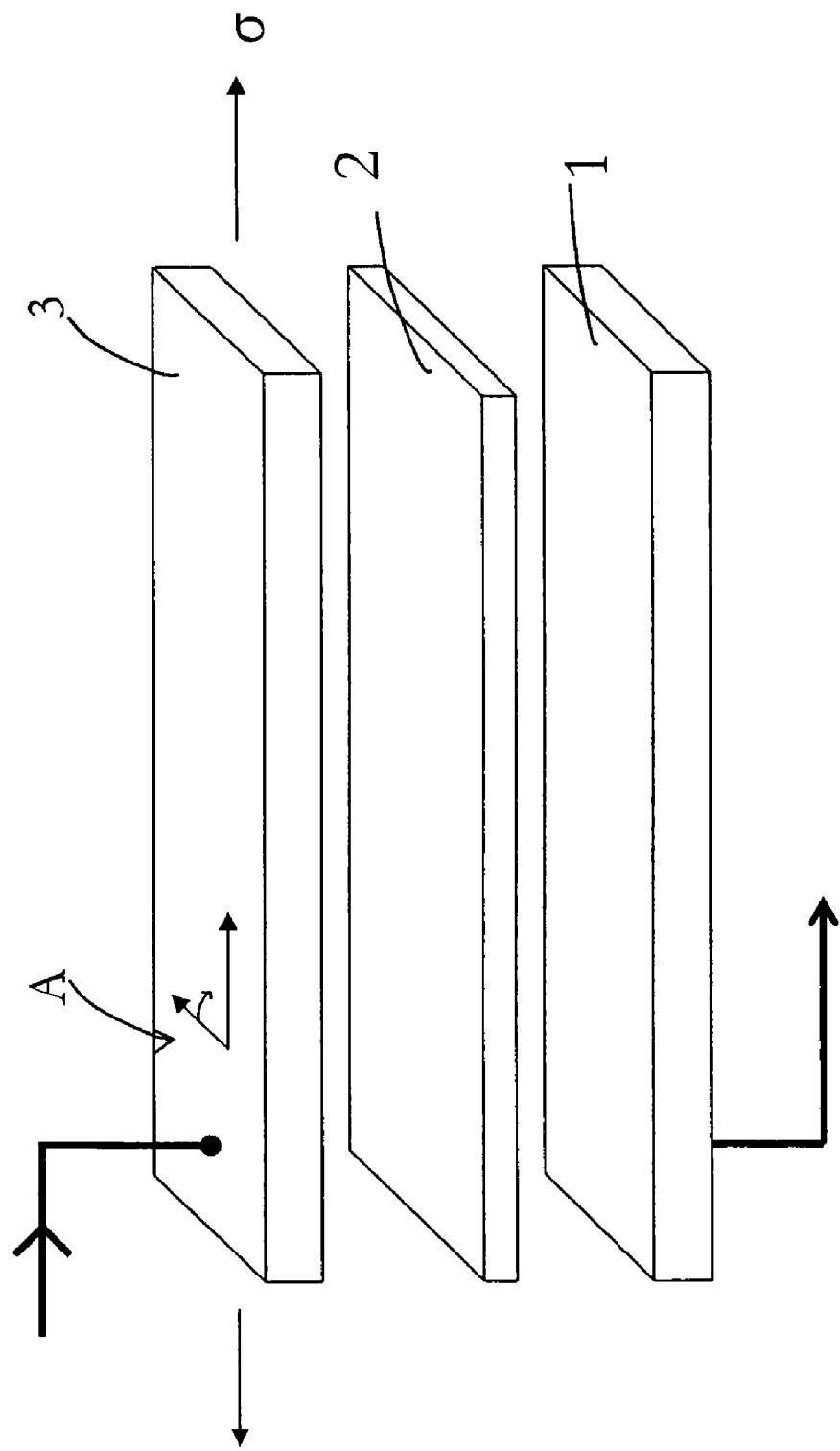
FIG. 1 shows a sensor layer sequence.

FIG. 1 is an exploded view of a magneto-elastic TMR sensor used to measure mechanical magnitudes. This sensor comprises a magnetically hard layer 1 which is separated by a tunnel barrier 2 from a magnetostrictive layer 3 which in particular may be an alloy containing CoFe. By applying an external mechanical stress (arrow σ), the direction of magnetization (arrow A) changes in the manner described above and thereby the resistance of the system crossed by the current I. Experiments carried out on such sensors with magnetically soft CoFe layers and amorphous (FeCo)SiB alloys are described below.

The magnetic tunnel elements are made by sputtering. The magnetically pinned layer consists in all samples of an 8 nm $Ir_{23}Mn_{77}$ antiferroamgnetic (AF) layer and of a 2.5 nm layer of Co—Fe. A 1.5 nm thick layer of aluminum is deposited as the tunnel barrier and is oxidized by plasma oxidation. Magnetostrictive $Fe_{50}Co_{50}$ and amorphous $(Fe_{90}Co_{10})_{78}Si_{12}B_{10}$ alloys nominally 6 nm thick are used as the free layers.

The magnetic tunnel elements were sputtered with the magnetostrictive soft-magnetic $Fe_{50}Co_{50}$ layer and the magnetic tunnel elements with the $(Fe_{90}Co_{10})_{78}Si_{12}B_{10}$ soft-magnetic layer was carried out after they were removed from the vacuum following aluminum layer oxidation. The subsequent sputtering of the soft-magnetic magnetostrictive layer was carried out four days later in another procedure.

To ascertain the effect of the applied mechanical tension on magnetic tunnel elements and on TMR-based strain gauges, a bending device was built which allows measurements of magnetic-field dependent resistance at up to 1.8 tesla and simultaneously measurement of the homogeneous sample elongation. Homogeneous elongation of the magnetic tunnel elements is attained using the so-called four-point bending method. Elongation is implemented by displacing a so-called slider containing two ceramic bars in particular 3 mm in diameter. These bars are mutually 6 mm apart and configured centrally between two fixed supports (3 mm dia.; 18 mm apart).

Figure 2A:
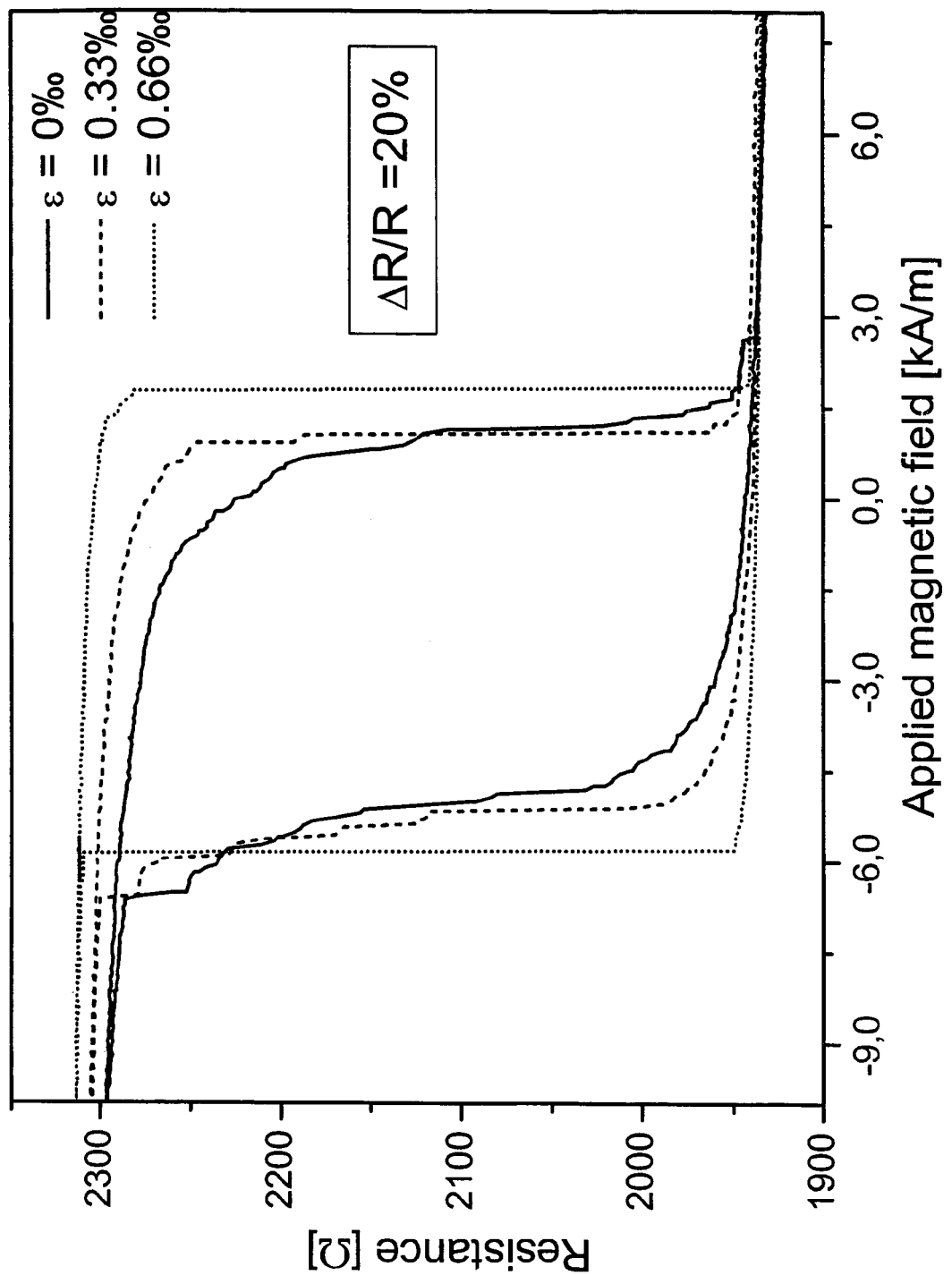
FIG. 2 shows the resistance as a function of the applied magnetic field.

FIG. 2a shows the effect of applied mechanical tension on a 20µ×20µ magnetic tunnel element which was prepared including a soft-magnetic $Co_{50}Fe_{50}$ layer 6 nm thick. The minor-loop measurement shown in FIG. 2a is carried out in the parallel configuration (the applied tension is parallel to the magnetic orientation of the magnetic tunnel element and to the applied magnetic field). The black, dashed curve of resistance vs applied magnetic field represents the unstretched state of the magnetic tunnel element whereas the dark-gray and the light-gray curves each resp. represent measurements at 0.33% and 0.66% elongation. The tunnel magneto-resistance is 20% and is nearly constant for all three measurements. The reversal behavior of the magnetostrictive $Fe_{50}Co_{50}$ soft-magnetic layer shows a null point shift of 1.5 kA/m (19 oersteds) from the null field due to the Neel coupling between the ferromagnetic layers (B. D. Schrag et al, Appl. Phys. Lett., vol. 77, pp 2373, October 2000, "Néel orange-peel coupling in magnetic tunnel junction devices"). This behavior reveals a steeper rise, namely an increase in coercive field intensity and a shallower rise of the tunnel magneto-resistance.

Figure 2B:
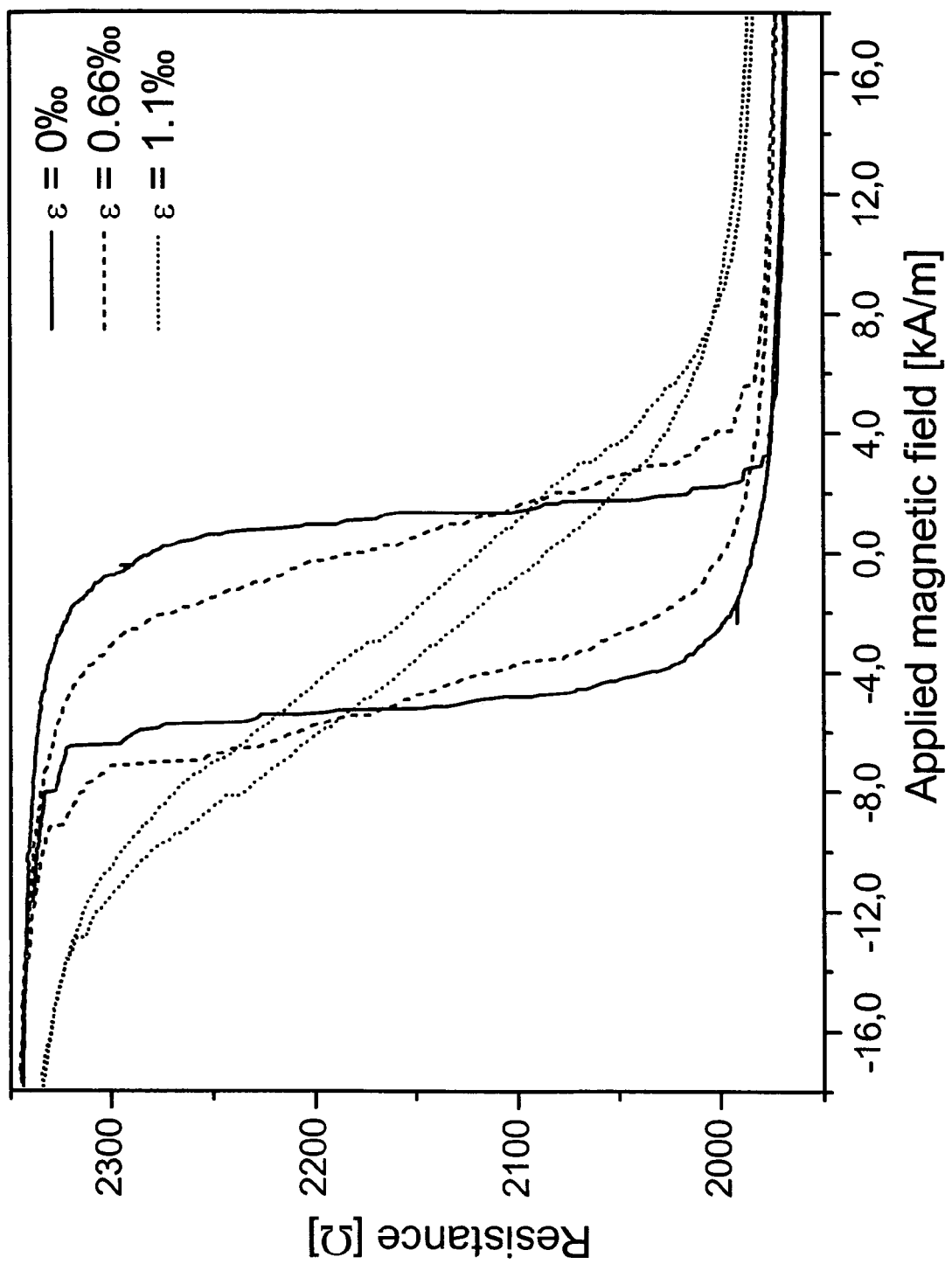

FIG. 2b shows the measurement of a similar magnetic tunnel element in the so-called parallel configuration, though in this instance under compressive stress. A decrease in slope and narrower hysteresis of the soft-magnetic, magnetostrictive layer will be observed. These changes are attributed to a stress-induced change in the anisotropy of the soft-magnetic layer. A 50% change of the initial tunnel magneto-resistance is expected from the maximally possible change of 90° of the direction of magnetization of soft-magnetic layer due to the applied stress. Data analysis shows this 50% change of the tunnel magneto-resistance also (17% to 8%) for a relative change in elongation $\Delta\epsilon$ of 1.1%.

On account of their high susceptibility to elongation, amorphous, magnetostrictive Fe-based alloys are appropriate materials for the strain gauges of the present invention. Accordingly $(Fe_{90}Co10)_{78}Si_{12}B_{10}$ was selected as the material with which to develop this high-sensitivity tunnel-magnetoresistive strain gauge.

Figure 3:
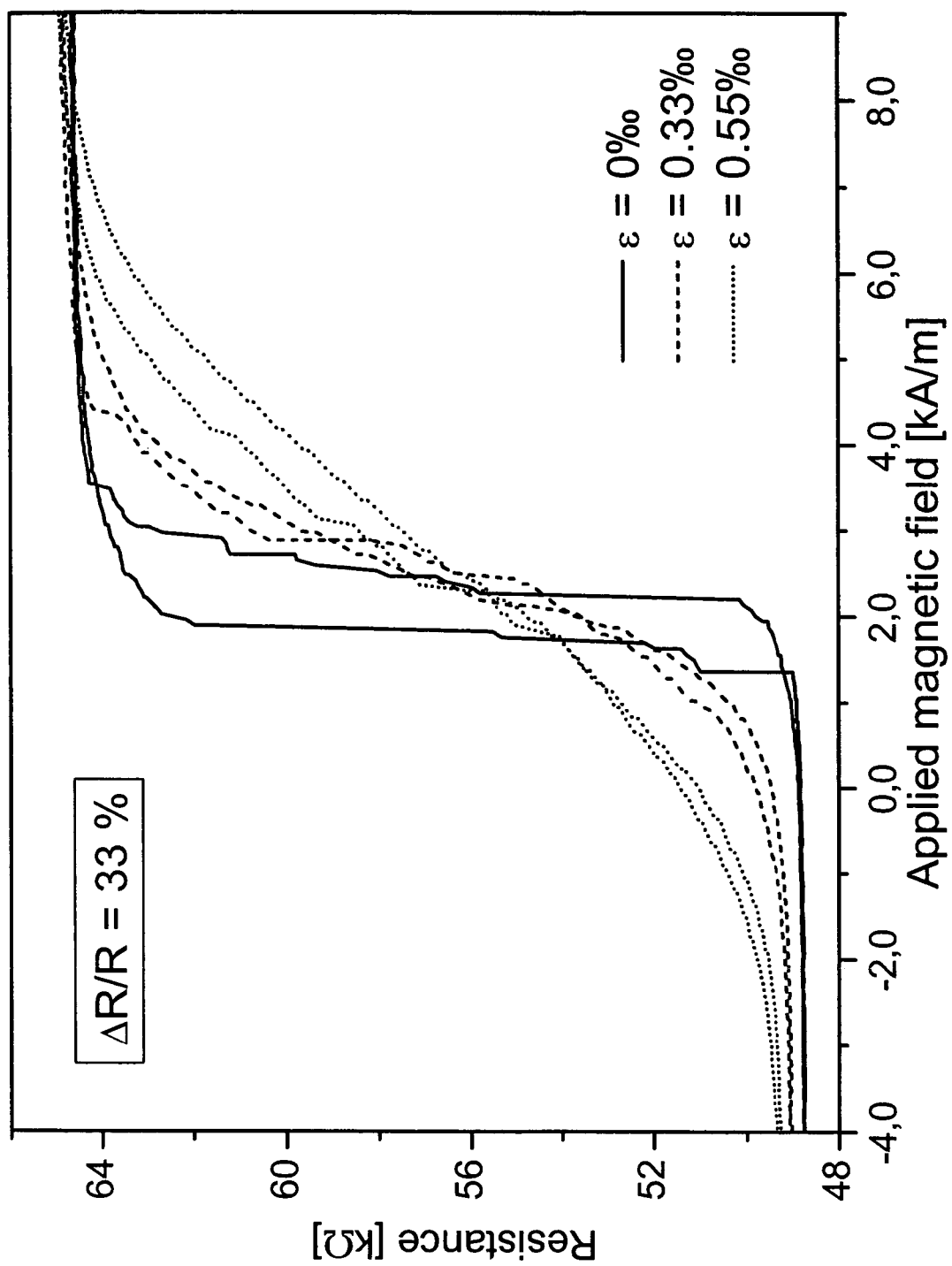
FIG. 3 shows the effect of compressive stress on a 20µ×20µ magnetic tunnel element fitted with an amorphous [$Fe_{90}, Co_{10})_{78}Si_{12}B_{10}$] magnetostrictive layer.

FIG. 3 shows a typical measurement of a soft-magnetic, amorphous, magnetostrictive $(Fe_{90}Co_{10})_{78}Si_{12}B_{10}$ layer using a magnetic tunnel element 20µ×20µ in size. The dashed black line (resistance vs applied magnetic field) shows the unstressed state of the magnetic tunnel element, the dark gray and light gray curves resp. having been measured 0.33% and. 55% elongation. The tunnel magneto-resistance is 33% and is nearly constant in all three curves. A 50% change in the initial tunnel magneto-resistance (from 30% to 15%) is observed at $\Delta\epsilon=0.55\%$. The gain is 300 for the soft-magnetic amorphous, magnetostrictive $(Fe_{90}Co_{10})_{78} Si_{12}B_{10}$ tunnel element. As regards TMR sensors comprising magnetostrictive $Fe_{50}Co_{50}$ layers 2.5 nm thick and prepared entirely under vacuum, tunnel magneto-resistances of 48% were measured. The gains were 450–600.

The design of a highly sensitive magnetostrictive sensor entails the required and simultaneous optimization of a plurality of properties. Illustratively a large magneto-resistance effect is required, further a large magneto-elastic coupling coefficient for the sensor layer, also a reference layer of low magnetostriction or with a sign opposing magnetostriction, and a tunnel barrier that remains undegraded by mechanical stresses. It was observed that a conventional TMR structure might be used for angle sensors and would show a signal of about 20%, on the other hand will not respond to mechanical stresses. Moreover the $(Ni_{84}Fe_{16}/Cu/Co/FeMn)$ GMR structure cannot be directly transferred to TMR structures because their insufficient spin polarization would result in too low a signal and the NiFe alloy used exhibits only low magnetostriction. As regards the illustrative invention embodiments discussed herein, we were able to simultaneously meet said partly conflicting requirements by using crystalline or amorphous Co alloys of high spin polarization and high magnetostriction and/or by selecting exchange-bias systems wherein the pinned layers react only slightly or not at all to external stresses.

Illustrations of the invention include sensors comprising a reference layer free of magnetostriction and a measuring layer which is magnetostrictive, the said reference layer exhibiting a sign different from the measuring layer magnetostriction and the reference and/or measuring layers consisting of several ferromagnetically coupling layers. The measuring layer may consist of magnetostrictive, crystalline or also amorphous alloys containing Fe and Co. Moreover layers made of maximally magnetostrictive materials such as rare earth materials, for instance TERFENOL (Tb, Dy) $Fe_2$ and combinations for instance of the sort of $CoFe(Tb, Dy)Fe_2$ are conceivable. The following stacked layers are cited as illustrative embodiments:

Ta5/Cu30/IrMn8/CoFe2.5/$Al_2O_3$/CoFe2.5/Ta10
Ta5/Cu30/Ni6/$Al_2O_3$/CoFe6/Ta10
Ta5/Cu30/Ni6/CoFe1/$AL_2O_3$/CoFe6/Ta10
Ta5/Cu30/Ru5/IrMn8/CoFe2.5/$Al_2O_3$/FeCoSiB6/T10
Ta5/Cu30/Ru5/IrMn8/CoFe2.5/$Al_2O_3$/((Tb,Dy))Fe6/Ta10
Ta5/Cu30/Ni6/CoFe1/$Al_2O_3$/CoFe1/((Tb,Dy))Fe6/Ta10.

All numbers in the stacked layers are in nm. Moreover $CoFe=Co_{50}Fe_{50}$; $FeCoSiB=(Fe_{90}Co_{10})_{78}Si_{12}B_{10}$; the thickness of $Al_2O_3$ is 2 nm.

The invention claimed is:

1. A sensor for measuring mechanical changes in length, comprising a sandwich system with two flat and superposed electrodes separated by a tunnel barrier, an electric current being set up between the electrodes and through the tunnel barrier,
wherein
a first one of the electrodes includes a highly magnetostrictive layer responding to elongation, having signal contributions due to anisotropies caused by mechanical tension being larger than those due to intrinsic anisotropies, and providing relative changes in system resistance $\Delta R/R$ of more than 10% upon elongation at room temperature; and
the highly magnetostrictive layer includes an alloy containing CoFe.

2. The sensor as claimed in claim 1, wherein a second one of the electrodes includes a magnetic layer or a system of layers as a reference layer, and wherein the reference layer has signal contributions due to anisotropies caused by mechanical tension being less than those due to intrinsic anisotropies.

3. The sensor as claimed in claim 1, wherein the relative changes in system resistance $\Delta R/R$ are between 20 and 50%.

4. The sensor as claimed in claim 1, wherein the highly magnetostrictive layer includes a soft magnetic material exhibiting large spin polarization.

5. The sensor as claimed in claim 1, wherein the thickness of the alloy containing CoFe is less than 5 nm and said alloy is deposited on a layer made of an anti-ferromagnetic material.

6. The sensor as claimed in claim 2, wherein the reference layer is coupled by exchange coupling with a layer made of a natural anti-ferromagnetic material, whereby unidirectional anisotropy is created in the reference layer.

7. The sensor as claimed in claim 1, wherein the sandwich system fitted with the three superposed layers is covered further wit additional layers for the purpose of compensating interferences.

8. The sensor as claimed in claim 1, wherein the tunnel barrier is made by sputtering and exhibits a thickness of less than 50 nm.

9. The sensor as claimed in claim 8, wherein the tunnel barrier is a layer of aluminum oxide oxidized by plasma oxidation and exhibits a thickness of less than 5 nm.

10. The sensor as claimed in claim 1, wherein the layers of the sandwich system are approximately rectangular and have all sides less than 100 microns.

11. The sensor as claimed in claim 1, wherein the first electrode is a magnetically hard layer exhibiting uni-axial anisotropy.

12. The sensor as claimed in claim 1, wherein the highly magnetostrictive layer is composed of several single layers.

13. The sensor as claimed in claim 1, wherein the tunnel barrier is made by sputtering and exhibits a thickness of less than 20 nm.

14. The sensor as claimed in claim 8, wherein the tunnel barrier is a layer of aluminum oxide oxidized by plasma oxidation and exhibits a thickness of less than 1.5 nm.

15. A sensor for measuring mechanical changes in length, comprising a multilayer structure comprising a plurality of layers stacked one upon another in a thickness direction of said structure;
said layers comprising upper and lower layers which are electrodes and an intermediate layer sandwiched between said upper and lower layers;
said intermediate layer being a tunnel barrier which exhibits the tunnel magneto-resistance (TMR) effect, and defines, together with said electrodes, a tunnel current path tat extends from the upper layer, through an entire thickness of the intermediate layer and to the lower layer; and
wherein
said upper layer includes a highly magnetostrictive material that responds to stress applied thereto; and
the highly magnetostrictive layer includes a CoFe alloy.

16. The sensor as claimed in claim 15, wherein a material of the lower layer is magnetically harder than the highly magnetostrictive material of the upper layer.

17. The sensor as claimed in claim 16, wherein the magnetically harder material of the lower layer exhibits uni-axial anisotropy pointing anti-parallel to the orientation of the magnetically softer, highly magnetostrictive material of the upper layer.

18. The sensor as claimed in claim 17, wherein lower layer comprises a magnetic layer coupled to an anti-ferromagnetic layer.

19. The sensor as claimed in claim 15, wherein the highly magnetostrictive material of the upper layer includes an amorphous alloy of Co.

20. The sensor as claimed in claim 15, further comprising a mechanism for physically elongating or compressing said highly magnetostrictive material of said upper layer.

21. The sensor as claimed in claim 15, further comprising a measuring element coupled to said electrodes for measuring a current flowing in said current path when stress is applied to said highly magnetostrictive material of said upper layer, and, based on the measured current, outputting a signal indicative of a change in a physical dimension of said highly magnetostrictive material of said upper layer, said change being caused by said stress.

22. The sensor as claimed in claim 15, wherein said highly magnetostrictive material of said upper layer is elongatable by at least 33%.

23. A sensor for measuring mechanical changes in length, comprising a multilayer structure comprising a plurality of layers stacked one upon another in a thickness direction of said structure;
said layers comprising upper and lower layers which are electrodes and an intermediate layer sandwiched between said upper and lower layers;
said intermediate layer being a tunnel barrier which exhibits the tunnel magneto-resistance (TMR) effect, and defines, together with said electrodes, a tunnel current path that extends from the upper layer, through an entire thickness of the intermediate layer and to the lower layer; and
wherein
said upper layer includes a highly magnetostrictive material that responds to stress applied thereto; and
said lower layer is a reference layer having low magnetostriction or a magnetostriction sign opposite to that of the highly magnetostrictive material of said upper layer.

24. A method of measuring physical changes in length, said method comprising
providing a multilayer structure comprising a plurality of layers stacked one upon another in a thickness direction of said structure;
wherein
said layers comprise upper and lower layers which are electrodes and an intermediate layer sandwiched between said upper and lower layers;
said intermediate layer is a tunnel barrier which exhibits the tunnel magneto-resistance (TMR) effect, and defines, together with said electrodes, a tunnel current path that extends from the upper layer, through an entire thickness of the intermediate layer and to the lower layer; and
said upper layer includes a highly magnetostrictive material that responds to stress applied thereto, and the highly magnetostrictive layer includes a CoFe alloy;
applying stress to said highly magnetostrictive material of said upper layer to cause a change in a physical dimension of said material of said upper highly magnetostrictive layer;
measuring a current flowing in said current path when said stress is applied to said highly magnetostrictive material of said upper layer; and
based on the measured current, outputting a signal indicative of said change in the physical dimension of said material of said upper highly magnetostrictive layer.

25. The sensor as claimed in claim 15, wherein said CoFe alloy includes one selected from the group consisting of $Co_{50}Fe_{50}$ and $(Fe_{90}Co_{10})_{78}Si_{12}B_{10}$.

26. The sensor as claimed in claim 15, wherein said lower layer is a reference layer having low magnetostriction or a magnetostriction sign opposite to that of the highly magnetostrictive material of said upper layer.

* * * * *